(12) United States Patent
Heenan et al.

(10) Patent No.: US 11,860,309 B2
(45) Date of Patent: Jan. 2, 2024

(54) 3D IMAGING SYSTEM AND METHOD OF 3D IMAGING

(71) Applicant: TRW Limited, Solihull (GB)

(72) Inventors: Adam John Heenan, Chesterfield (GB); Martin Thompson, West Midlands (GB); Roger Hazelden, Solihull (GB); Rob Pinnock, Birmingham (GB)

(73) Assignee: TRW Limited, Solihull (GB)

( * ) Notice: Subject to any disclaimer, the term of this patent is extended or adjusted under 35 U.S.C. 154(b) by 1171 days.

(21) Appl. No.: 16/360,306

(22) Filed: Mar. 21, 2019

(65) Prior Publication Data

US 2019/0293797 A1    Sep. 26, 2019

(30) Foreign Application Priority Data

Mar. 21, 2018   (GB) .................................... 1804550

(51) Int. Cl.
| | |
|---|---|
| *G01S 7/48* | (2006.01) |
| *G01S 7/481* | (2006.01) |
| *G01S 7/484* | (2006.01) |
| *G01S 7/4863* | (2020.01) |
| *G01S 17/10* | (2020.01) |
| *G01S 17/93* | (2020.01) |
| *G02B 27/10* | (2006.01) |
| *G01S 17/894* | (2020.01) |

(52) U.S. Cl.
CPC ............ *G01S 7/4815* (2013.01); *G01S 7/484* (2013.01); *G01S 7/4816* (2013.01); *G01S 7/4863* (2013.01); *G01S 17/10* (2013.01); *G01S 17/894* (2020.01); *G01S 17/93* (2013.01); *G02B 27/10* (2013.01)

(58) Field of Classification Search
None
See application file for complete search history.

(56) References Cited

U.S. PATENT DOCUMENTS

| | | | |
|---|---|---|---|
| 5,274,430 A | 12/1993 | Lux | |
| 7,420,656 B1 | 9/2008 | Sandusky et al. | |
| 8,471,895 B2 * | 6/2013 | Banks ................... | G01S 7/4865 382/284 |
| 2001/0052985 A1 | 12/2001 | Ono | |

(Continued)

FOREIGN PATENT DOCUMENTS

EP           1569007 A2     8/2005

OTHER PUBLICATIONS

European Search Report, Application No. 19164414.5, dated Jul. 31, 2019.

(Continued)

*Primary Examiner* — Hovhannes Baghdasaryan
(74) *Attorney, Agent, or Firm* — MacMillan, Sobanski & Todd, LLC

(57) ABSTRACT

A 3D imaging system includes a light source arranged to illuminate a scene with at least one optical pulse including light of at least two discrete wavelengths; an optical detector including an array of detection elements; and an optical modulator interposed in the optical path between the scene and the optical detector, the modulator being arranged to differentially amplitude modulate the two wavelengths in the reflected portion of the optical pulse as a function of time.

14 Claims, 6 Drawing Sheets

(56) References Cited

U.S. PATENT DOCUMENTS

2010/0128109 A1   5/2010  Banks
2014/0098192 A1   4/2014  Park et al.
2017/0115395 A1   4/2017  Grauer et al.

OTHER PUBLICATIONS

Liu, A graphene-based broadband optical modulator, Nature, Jun. 2011, DOI: 10.1038/nature10067, Source: PubMed.
Patents Act 1977: Search Report, Application No. GB 1804550.0, dated Aug. 15, 2018.

* cited by examiner

Image 1

Image 2

3D IMAGING SYSTEM AND METHOD OF 3D IMAGING

BACKGROUND OF THE INVENTION

This invention relates to a system for 3D imaging and to a system for determining the range of at least one object within a field of view, in particular for use as part of an autonomous or semi-autonomous vehicle. It also relates to methods of 3D imaging and range determination.

The use of a 3D imaging apparatus to capture the 3D position of objects in a scene is becoming more and more commonplace for applications such as autonomous vehicles. By detecting the location, in particular the range, of objects in a scene around a vehicle, it is possible to control the speed and direction of the vehicle to ensure that the vehicle does not collide with any of the objects, or to enable the vehicle to follow an object that is moving in the scene. To detect small objects at large distances, the imaging apparatus must have a high resolution. The high resolution images may be fed to a suitable signal processing unit that forms part of the vehicle control system.

One particular technique that can be used to capture 3D images of a scene is known as LIDAR. The principle behind a LIDAR apparatus is to bounce pulses of light off objects to see where they are, just as radar uses radio waves and sonar uses sound. LIDAR systems send out pulses of light outside of the visible spectrum (although the light could be within the visible spectrum in some applications) and time how long it takes for them to bounce back. The time it takes for the light to travel from the light source, bounce off the object, and reflect back onto a detector tells the sensor how far away the object is.

LIDAR systems may generate a large number of narrowly focused light pulses, each being directed to a small spot in the scene. The spot is scanned across two dimensions, and the resulting set of reflection timings may then be plotted on a 3D map (called a "point cloud") in order to build up a detailed picture of the surroundings. This requires only a single element detector, but a set of complex scanning devices must be provided to build up the point cloud map. Also, the detector requires high precision timing circuitry to measure the time of travel of the light.

An alternative LIDAR technique is called 3-D flash LIDAR. This has advantages over other scanning LIDAR technology because it avoids the need for a scanner where the light source is physically scanned across a scene. In a typical 3-D flash LIDAR system, the detector comprises a 2D array of pixels, and each pixel records the time taken by a short-duration, wide-angle laser flash pulse to travel into the scene and bounce back from all of the objects in the scene to the image detector. Each detector element or pixel/pixel group has independent triggers and counters to record the time-of-flight of the laser light pulse to the object(s). The physical range of the objects in front of the camera is calculated from the time of flight information.

The main problem with time-of-flight-based 3-D flash LIDAR is the very precise trigger timing that is required in order to measure the time of flight of the laser pulses with sufficient accuracy to achieve the required range-resolution. A second problem is that the per-pixel electronic requirements take up a significant amount of pixel area. Hence, sensitivity is reduced, and/or the pixel size needs to be increased (and the imaging resolution correspondingly decreased).

An object of the present invention is to provide an improved system and apparatus for obtaining 3D images that does not require the high precision timing circuitry for the pixels of the detector.

SUMMARY OF THE INVENTION

According to a first aspect, the invention provides a 3D imaging system comprising a light source arranged to illuminate a scene with at least one optical pulse comprising light of at least two discrete wavelengths; an optical detector comprising an array of detection elements; and an optical modulator positioned in the optical path between the scene and the optical detector, the modulator being arranged to differentially amplitude modulate the two wavelengths in the reflected portion of the optical pulse as a function of time.

The 3D imaging system of the invention may, in use, produce a 2D image of the scene in an XY frame of reference, where each point is assigned distance or range information to an object imaged at that point. It is also within the scope of an aspect of the invention that the system, in use, identifies the location in the XY frame of one or more objects and the range of the object in the scene without producing a complete image of the scene, or simply outputs range information. It may, for example, in a most simple arrangement, output a signal indicative of the range of the closest object in the scene or even output an alert in the event that the range of the closest image is below a minimum threshold range.

The system may include focusing optics that focus a portion of the light pulse that has been reflected or scattered from objects in the scene onto the optical detector.

The light source may be arranged to illuminate the scene with at least two sets of temporally spaced optical pulses, each set of pulses comprising at least one pulse of light having at least two discrete wavelengths. Each set may cause reflected light to be incident upon the detector in a sequence that allows the detector to collect the light from each pulse before an integrator reads out values forming an image. From the two sets, two distinct images may therefore be output from the detector.

The system may, in use, continuously emit sets of pulses, or emit the pulses in batches at defined times when 3D images of the scene are required.

The optical detector may comprise a single array of detector elements, typically arranged in a regular two-dimensional grid, wherein each detector element in the detector array is responsive to both of the wavelengths to produce an output signal having a value indicative of the spectral content, or color, of the light incident on the detector element. As such, the detector array will generate a respective color image from the set of output signals for each of the two sets of pulses from the values output by the array of detector elements. Notably, the detector array does not require any of the complex and high precision timing circuitry of prior art LIDAR systems because the range is encoded as the colors in the image, rather than in the time of arrival of the light at the detector.

Suitable detectors that may be used in the system of the invention include Bayer filter array sensors.

Each detector element may comprise at least two pixels, each one responsive to a different one of the two wavelengths, and the output of the element may comprise an intensity value from each pixel or a single spectral composition or color value obtained by processing together the values from the two pixels. Suitable pixelated detectors are well known to the person skilled in the art for use in a wide range of cameras for both the visible and non-visible spectrum. Because the individual pixels do not require the complex trigger electronics of prior art LIDAR systems, the cost and complexity of the detectors can be minimized by using widely available off the shelf components.

The term "color" in the context of this invention refers to the spectral composition of the light that is incident on each part of the detector. Where the detector comprises an array of detector elements, this refers to the spectral composition of the light incident on each detector element. It is not to be limited to the visible spectrum of colors.

By differentially modulating the two wavelengths as a function of time, the light that impinges on a detection element of the detector from close objects will comprise a different ratio of the first wavelength to the second wavelength compared with the light that impinges on a detection element at a later time from more distant objects. This is because the time of the round trip from source to detector is shorter for near objects than for more distant objects and because the modulation applied at those two times is different.

The modulator may modulate the reflected light over a period of time equal to or greater than the time that it takes the light from a single pulse to travel from the source to the furthest object in the scene and back to the detector.

The modulation period of the modulator may be synchronized with the emission of the light pulses so that each modulation period starts at the time that the emitted pulse is generated by the source or at some known time delay after the start. It should, in any case, start before light from the closest possible object in the scene can be reflected or scattered back to the detector and not end until the light from the furthest object that it is desired to detect has been reflected back to the detector.

To synchronize the modulation period to the light pulses, a control unit may be provided that generates a common trigger signal for the light source and the modulator. Each time the trigger signal is generated, a pulse may be emitted and the modulation period started.

A set of pulses may comprise one, two, or more than two pulses, each being identical in spectral composition for the duration of the pulse. Each pulse may comprise a broadband pulse of white light from a white light source, or may comprise two distinct narrow wavelength bands. The two narrow wavelength bands may be produced by a respective laser, with each laser having a different wavelength.

Each pulse may, therefore, be generated by a single source that emits the two or more wavelengths, or from multiple sources that emit light simultaneously and each emit one or more of the two wavelengths.

To direct the reflected or scatted light onto the detector, the system may include focusing optics, such as a single focusing lens, located upstream of the modulator, that forms an image of the scene onto a focal plane. The detector may be positioned in the focal plane. The design of suitable focusing optics will be familiar to the person skilled in the design of camera systems and, thus, will not be described in detail here.

The function of the optical modulator is to encode the reflected light with range information by differentially amplitude modulating the spectral content of the light that passes through or is reflected from it as a function of time.

While there may be two wavelengths that are modulated, the invention may apply to the use of a broadband light source having more than two wavelengths, with the spectral content being differentially amplitude modulated across more than two wavelengths. For instance, white light may be used, and the modulator may attenuate the light to apply a continuously or stepwise variable tint from one end of the spectrum to the other. Where the white light is in the visible spectrum, the tint may vary from the red end of the spectrum to the blue end of the spectrum in discrete steps or in a continuously-variable manner.

The modulator may amplitude modulate in the manner of a notch filter of varying center wavelength or in the manner of a bandpass filter of varying center wavelength, or in a range of different manners.

The modulator may be operable in more than one mode.

One suitable optical modulator comprises a variable wavelength filter that, in a first mode of operation, differentially modulates the two wavelengths such that the first wavelength is increasingly attenuated over time during the modulation period, and the second wavelength is not attenuated or is decreasingly attenuated over that time or is attenuated by a fixed amount.

The optical modulator may also operate in a second mode where it modulates the two wavelengths, whereby the second wavelength is increasingly attenuated over time, and the first wavelength is not attenuated or is decreasingly attenuated or is attenuated by a fixed amount.

In each mode, the modulation may vary linearly throughout the modulation period or may vary non-linearly. It may vary in a stepwise manner or continuously.

The provision of a modulator that can operate in two modes enables range information to be obtained without the need to have any compensation for the effect of the color of the objects on the scene, which will itself modulate the light from the light source.

To take advantage of this feature, in use, the detector may be arranged to capture a first image of the scene corresponding to the first set of pulses whereby for each pulse, the modulator is operated in the first mode only, and in which the detector captures a second image of the scene corresponding to the second set of pulses whereby for each pulse, the modulator is operated in the second mode only.

The first image is captured at a different time to the second image, allowing the one detector array to sequentially form a first image and a second image. The apparatus may comprise a signal processing circuit that determines the range of objects in the scene by comparing the spectral content of the light encoded in the color value for each detector element in the array in the first image with the spectral content of the light encoded in the color value for each corresponding detector element in the array in the second image.

The points in the 3D image may be generated by comparing, on a detector element-by-detector element basis, either the color or the intensity of the light encoded in the value of the signal output by the detector elements (depending on the particular system configuration), for instance using a look-up table that relates the resulting "comparison value" to a corresponding range value. It is possible to determine a "Relative Intensity" value RI using the equation:

$$RI=[(I(B)\%*\text{object reflectivity}(B))+(I(R)\%*\text{object reflectivity}(R))]*[\text{inverse square range factor}]*[\text{modulator factor}]$$

where the first and second wavelength intensities I(B) and I(R) depend on the spectral composition of the transmitted light and the color of the reflecting object, the electro-optic modulator goes from 0% first wavelength to 100% first wavelength over the modulation period (and the same in reverse for the second wavelength), and the calculations use a gray object. Tests using blue and red wavelengths and a gray object located at a five foot range as a base-line (=100% at detector) yielded good results in an experimental model.

The system of the first aspect may, in use, output a 3D image of the scene based on combining the two captured images.

The applicant proposes that a suitable optical modulator for use in a practical embodiment of the invention is an electro-optic wavelength modulator that ramps over a period dependent on the maximum distance over which object ranges are to be measured. The effect of the ramp is to vary the frequency response of the modulator, in terms of the relative attenuation of the amplitude of at least the two discrete wavelengths in the reflected light.

The modulator may comprise a graphene-based, electro-optic variable filter modulator. Research on graphene technology has shown that these devices have the capability to operate at the required modulation frequencies and at low operating voltages, making them suitable for use in a wide range of applications, such as in a commercial automotive product. A suitable graphene device is disclosed in a publication by Erick Ulin-Avila et al. entitled "A Graphene-Based Broadband Optical Modulator"; Article in Nature, June 2011, DOI: 10.1038/nature10067, Source: PubMed: https://www.researchgate.net/publication/51107563_A_graphene-based_broadband_optical_modulator.

To generate short (~1 ns) white light pulses for transmission, a source such as a white light supercontinuum laser (see, for example, https://www.leica-microsystems.com/science-lab/white-light-laser/) can be used. Where a two wavelength source is used instead, two tunable or fixed wavelength lasers can be provided.

While it is possible to capture two images in a sequence and combine them to generate a 3D image, it is possible in an alternative arrangement to provide two detector sub-arrays and to capture the two images simultaneously.

A detector array may be provided that comprises a first subarray of detection elements that are each responsive to the first wavelength but not the second, and a second subarray of detection elements that are each responsive to the second wavelength but not the first, each subarray being arranged, in use, to output a monochromatic image.

A beam splitter may be provided that receives the light reflected or scattered from the scene and splits it into two beams, a first beam forming an image of the scene on the first sub-array and a second beam forming an image of the scene on the second sub-array. The images from the two sub-arrays may be combined to generate the 3D range information.

The first and second sub-arrays may comprise color detector arrays that are each covered with a filter corresponding to a respective one of the two wavelengths so that each is only responsive to one of the two wavelengths. Alternatively, each may be a monochromatic detector.

The applicant has also appreciated that another factor to be taken into account is the potential movement of objects in the field-of-view between successive first and second images. For example, with an image capture rate (frame rate) of the order of 30 fps, this gives a time between successive frames of ~33 ms. The integration time for a single image formed from a set of pulses may be of the order of 1 ms). Many of these effects are common to other types of LIDAR, and ways of dealing with them in the processing of the received signals are known.

The applicant has also appreciated that the effect of object color may have a significant influence. Accordingly, it is proposed that the system is configured to cancel this effect out by appropriate processing of the color data from the first and second images.

Alternatively, the system may be arranged, in use, to capture a third image when the modulator is operated in a third mode, where the wavelength modulator applies no modulation or applying an equal modulation to all wavelengths, the third image providing a reference. The signal processing circuit may then be arranged to use the third image to compensate for any common-mode effects on the first and second images, for instance by subtracting the third image from the first and second images or using the third image to apply a scaling factor to the first and second images.

According to a second aspect, the invention provides a method of 3D imaging objects in a scene, comprising illuminating the scene with at least one pulse of light; differentially amplitude modulating at least two wavelengths in a portion of the pulse that is reflected or scattered from objects in the scene and focusing the modulated light onto at least one detector to form an image of the scene; and processing the at least one image to determine the range of objects in the scene.

The method may comprise: (a) illuminating a scene at a first instance with a pulse of light comprising at least two discrete wavelengths, and illuminating the scene at a second instance with a second pulse of light having the same two wavelengths; (b) directing the reflected or scattered light from objects in the scene for the first pulse onto a detector array via an optical modulator, the modulator being arranged to apply a first amplitude modulation to the two wavelengths in the reflected portion of the optical pulse as a function of time; (c) directing the reflected or scattered light from objects in the scene for the second pulse onto the detector array via an optical modulator, the modulator being arranged to apply a second, different, amplitude modulation of the two wavelengths in the reflected portion of the optical pulse as a function of time; and (d) comparing a first image obtained from the detector corresponding to the first pulse with a second image obtained from the detector corresponding to the second pulse to form a 3D image of the scene.

The step (b) may comprise modulating the two wavelengths such that the first wavelength is increasingly attenuated over time and the second wavelength is not attenuated or is decreasingly attenuated over that time, and in which step (c) comprises modulating the two wavelengths whereby the second wavelength is increasingly attenuated over time and the first wavelength is not attenuated or is decreasingly attenuated.

The method may be performed using an apparatus having features in accordance with the first aspect of the invention.

The method may further comprise capturing a third image when the modulator applies no modulation to the reflected light. The method may comprise using the third image to compensate for the effects of differing colors of the objects in the scene causing common mode effects in the first and second images captured by the detector.

Various aspects of this invention will become apparent to those skilled in the art from the following detailed description of the preferred embodiments, when read in light of the accompanying drawings.

DETAILED DESCRIPTION OF THE PREFERRED EMBODIMENTS

Figure 1:
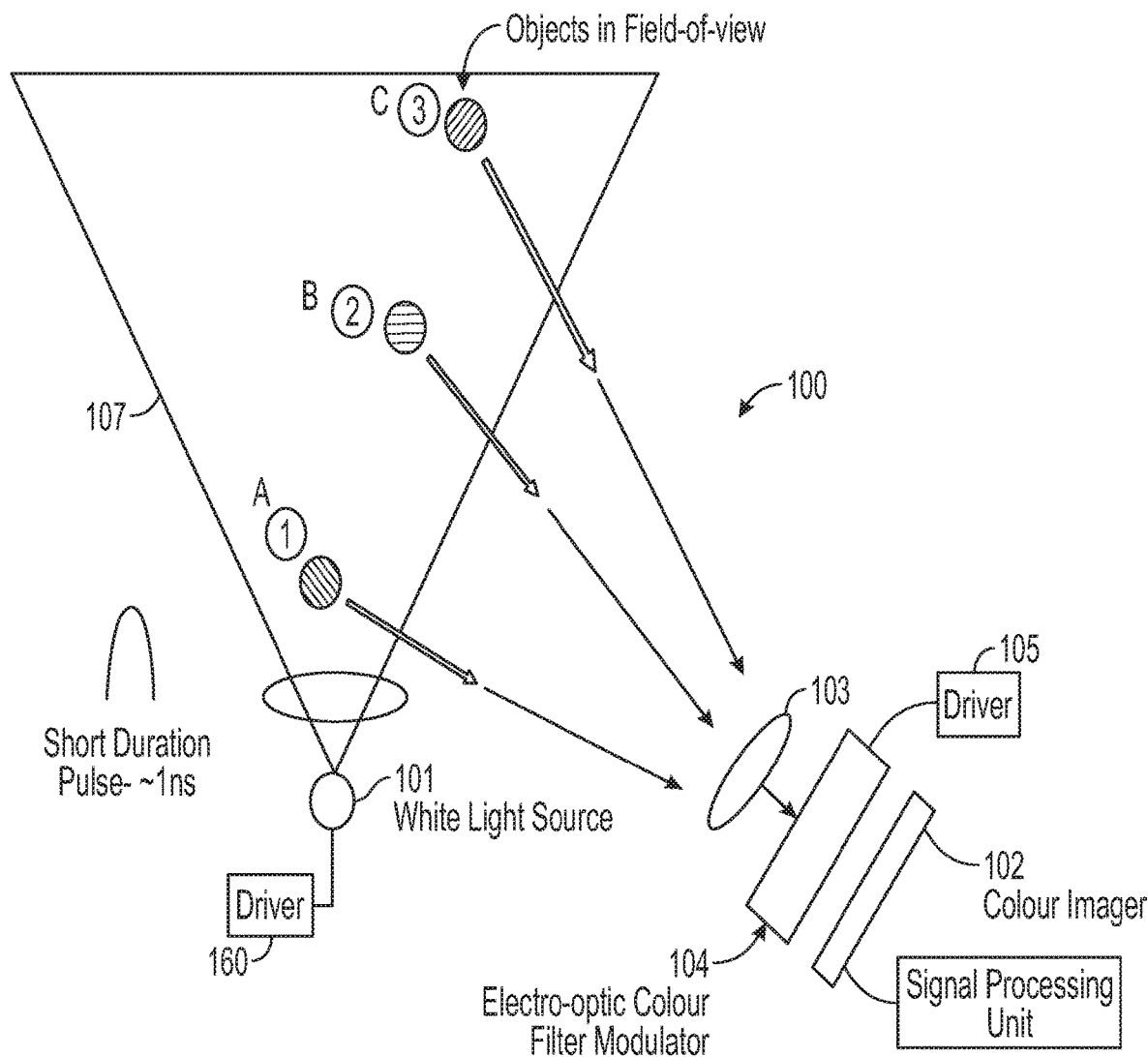
FIG. 1 is an overview of a first embodiment of a 3D imaging system in accordance with an aspect of the invention.

FIG. 1 shows the key components of a first embodiment of a 3D imaging system 100. The system comprises two main parts, namely, a light source and a color sensing camera. The light source, in this example, comprises a white light source 101 that illuminates a scene. The camera is located where it can image light reflected from objects in the scene.

The camera includes a detector or color imager 102 comprising a planar 2D array of detector elements or pixels/pixel sets, a focusing lens 103 that images the scene onto a focal plan containing the 2D array, and an optical modulator 104 that is located in the optical path between the lens 103 and the detector 102. In a modification, the modulator could be located upstream of the lens or integrated into the lens or the detector. The focusing optics may be more complex than a single lens and may comprise multiple lenses and/or reflectors to control the optical path of the light reflected or scattered from the objects in the scene.

The optical modulator 104 in this example comprises a graphene-based, electro-optic wavelength modulator. A driver circuit 105 is provided that, in use, applies a variable voltage to the modulator. This modulator functions as a transmissive filter where the amplitude attenuation of different wavelengths of light passing through the filter may be varied as a function of time. The modulator could alternatively operate in a reflective mode using a suitable back reflector.

The white light source 101 is driven by a driver 106, which causes it to output a sequence of short pulses of light. In this example each pulse has duration of about 1 ns, but other durations can be used within the scope of the invention. Each pulse of light is spread by a lens in front of the light source to evenly illuminate the scene. FIG. 1 shows three objects A, B, and C in the scene that are illuminated each time a pulse is generated. The cone 107 in the drawings defines the boundary of the scene, with any objects in that cone being detected by the system and any outside not being detected.

Each pulse of light from the source 101 will be partially reflected or scattered back from each of the three objects to the color-sensing camera, and, without the modulator 104, a full color image would be formed by the 2D array of detector elements as the reflected white light hits each pixel/pixel set of the array. In the arrangement of FIG. 1, before being imaged, the received light signals are passed through the graphene-based, electro-optic wavelength modulator, which encodes a differential wavelength amplitude modulation on the white light that impinges on the detector. In effect, this applies a time-dependent color tint to the light that reaches the detector, with the color of the tint depending on the time at which the light reaches the detector.

Figure 2A:
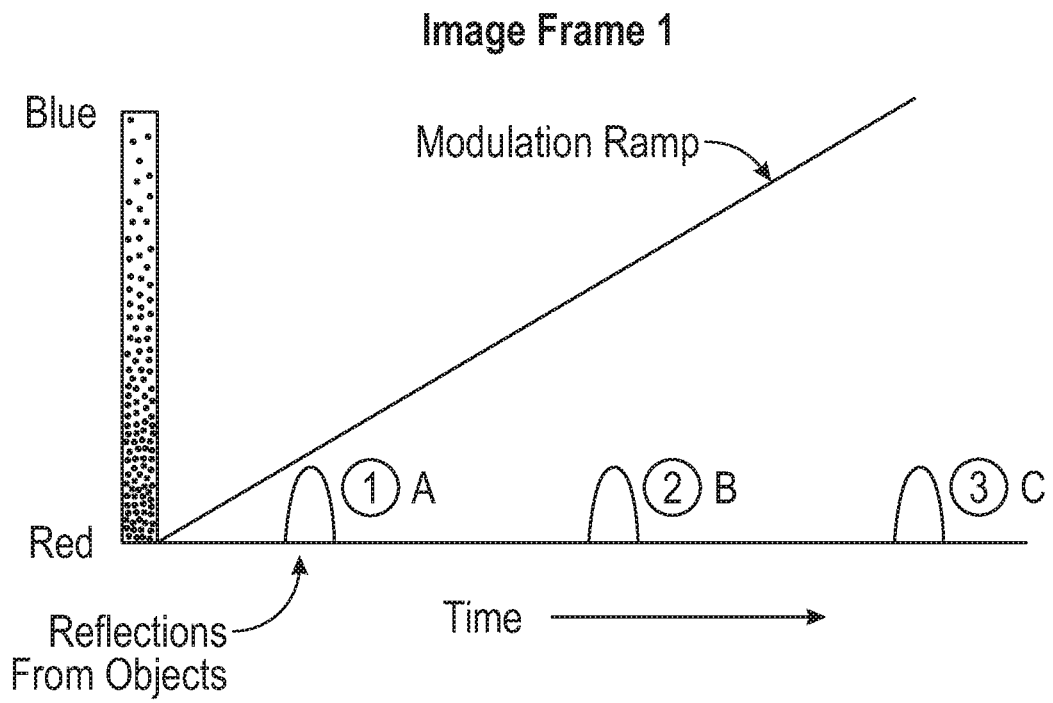
FIG. 2(a) shows the spectral response of the modulator varying over a period of time when operating in a first mode of operation.

In FIG. 2(a), for simplicity, the wavelength amplitude modulation is shown as ramping linearly over a period of time from red to blue, with the ramp occurring over the period it takes the pulse to travel from the laser to the furthest object in the scene and back to the camera. For example, if it is required to measure to a maximum range (object C) of 50 m, then the total journey time of a pulse to object C and back to the detector is $(2\times50)/3\times10^8 = 333$ ns. Hence, successive 1 ns laser pulses must, in this case, be transmitted with an intervening time gap of 333 ns.

Figure 2B:
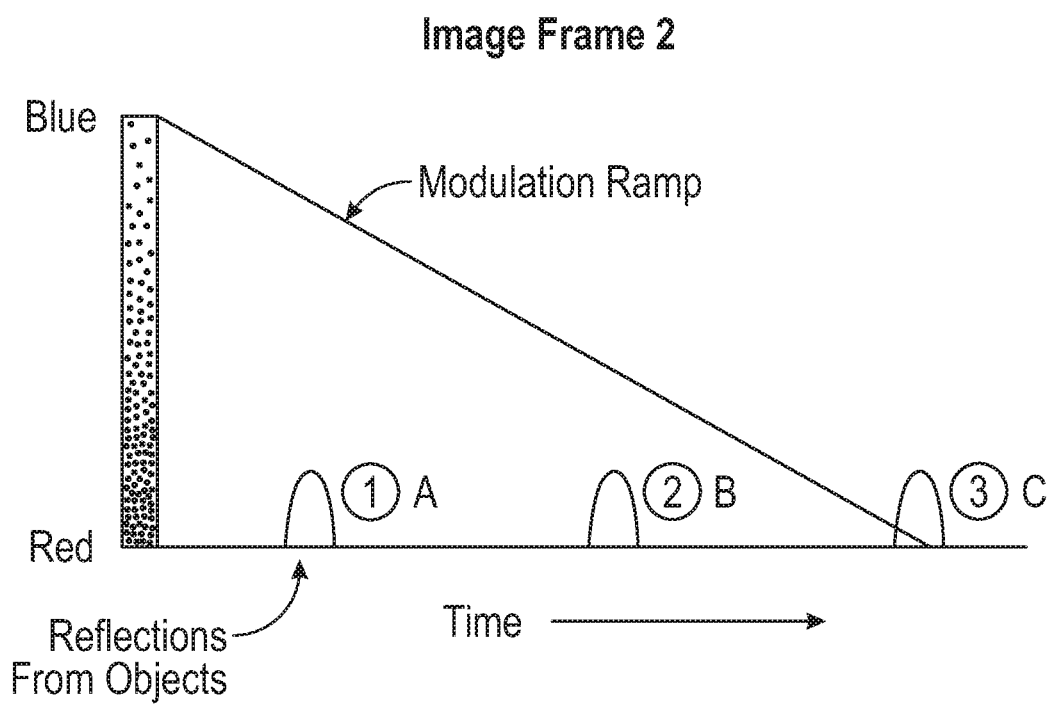
FIG. 2(b) shows the spectral response of the modulator varying over a period of time when operating in a second mode of operation.

In FIG. 2(b), the opposite ramp is applied with the wavelength modulation ramping linearly from blue to red over the same period. As will be described, the two ramps are applied for respective ones of a pair of images and, from this, the range of the objects may be calculated.

Figure 3:
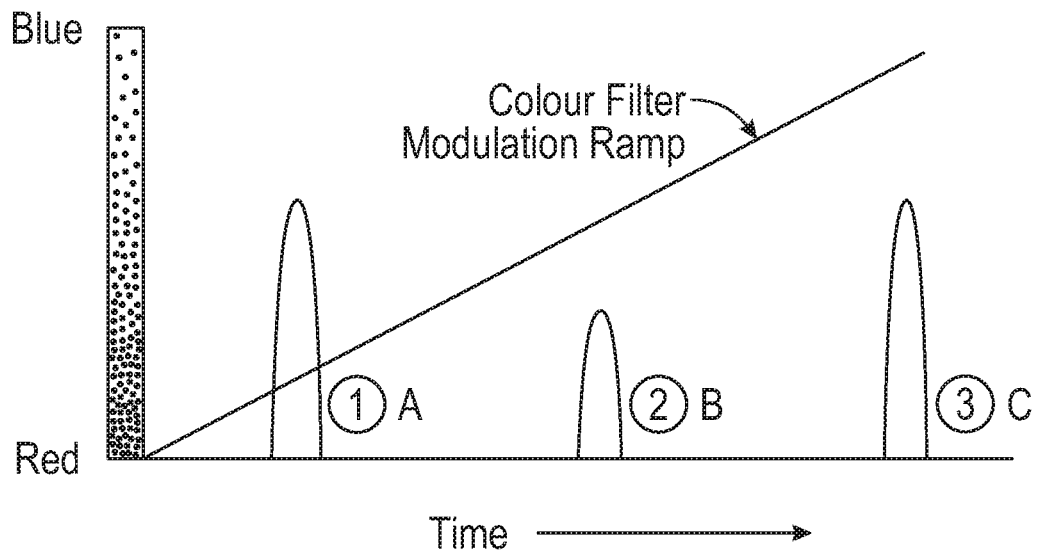
FIG. 3 shows the modulation of the two wavelengths in the light reflected from each object in the scene when the modulator is operating in the first mode for a single light pulse from the source.
Figure 4:
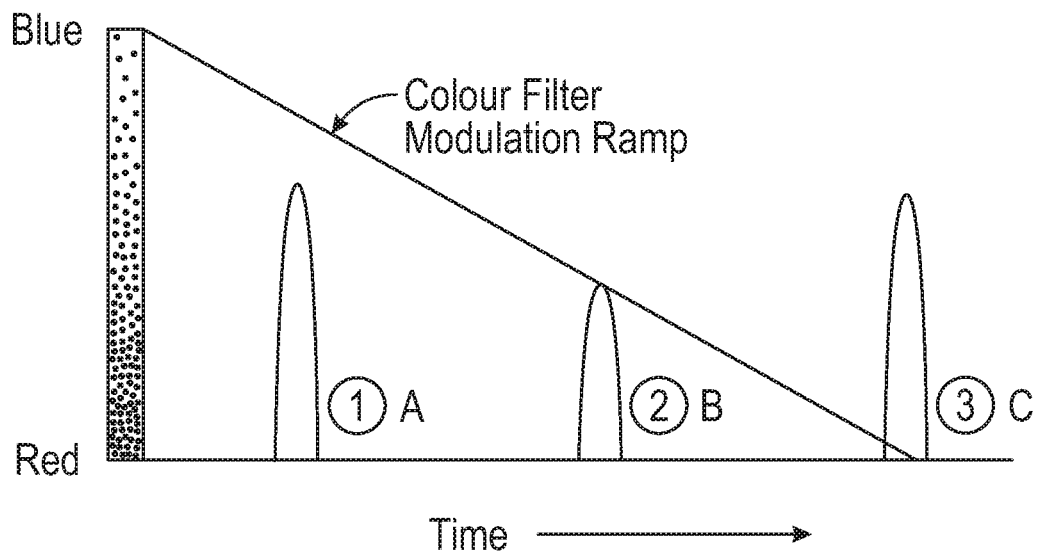
FIG. 4 shows the modulation of the two wavelengths in the light reflected from each object in the scene when the modulator is operating in the second mode for a single light pulse from the source.

FIGS. 3 and 4 illustrate how the light for each object is modulated dependent on the time of arrival at the modulator. In these figures, the attenuation of the red wavelength is represented by a solid line, and the attenuation of the blue wavelength is represented by a dashed line.

Figure 5:
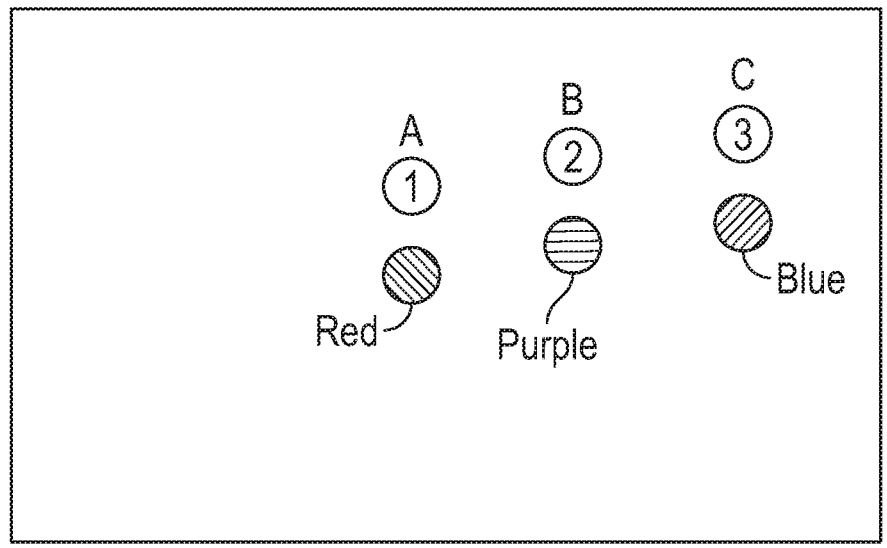
FIG. 5 shows the first color image captured by the detector for a set of first pulses, where the first mode is used for all pulses with objects at differing distances being encoded with different colors.

Assuming that the wavelength modulation ramp is initially going from red to blue as shown in FIG. 2(a), the white light arriving at the camera from short range objects (such as A) will pass through the wavelength modulator while it is still in the "red" part of its ramp, where the red wavelength has little attenuation and the blue a high attenuation. Hence, the light reaching the pixels of the array will be predominately "red." For longer range objects (such as B and C), the wavelength modulation ramp moves towards the blue end, with the red wavelength being heavily amplitude-attenuated and the blue wavelength less attenuated or not attenuated at all, so that the returned light reaching the pixels of the detector becomes increasingly "blue." This is illustrated in FIG. 5.

Figure 7:
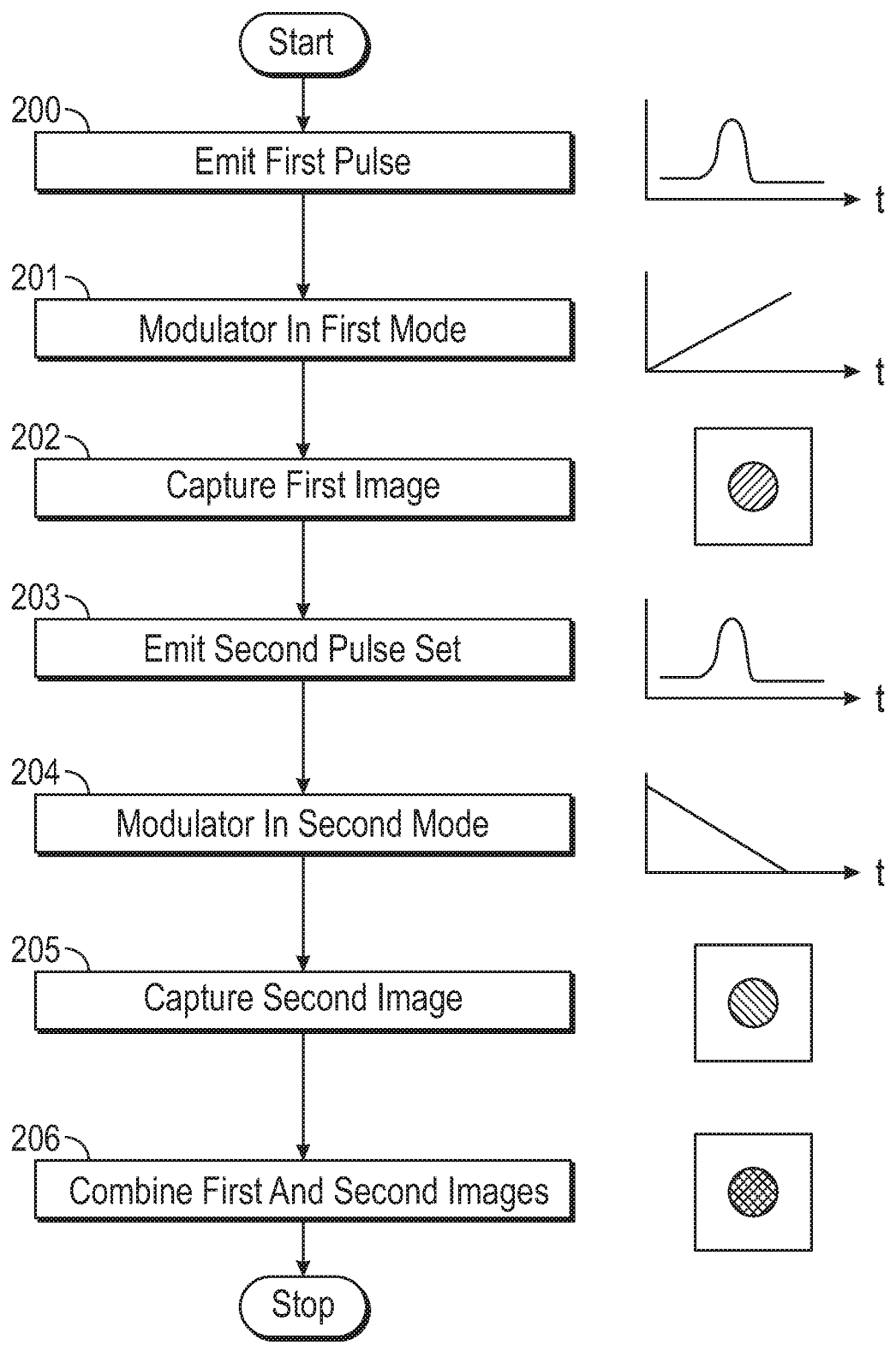
FIG. 7 is a flowchart showing the steps carried out by a method in accordance with the present invention.

The two images may be used to determine the range of the objects. A suitable exemplary method of use of the apparatus is set out in FIG. 7.

In a first step 200, a first pulse is emitted onto the objects A, B, and C in the scene. At the same time, the driver for the optical modulator triggers the modulation ramp 201 shown in FIG. 2(a). The modulated light is focused onto the modulator and transmitted from the modulator so that it hits the pixels of the array, which record the intensity and the color. In practice, many successive pulses, each separated by (in this example) 333 ns, are emitted sequentially during the integration period of the imager (~1 ms). For each of these pulses, the wavelength modulator moves in the same direction (e.g., from red to blue, as shown in FIG. 2(a). At the end of the integration period, a color encoded image is captured 202 from the array and stored in a memory.

Figure 6:
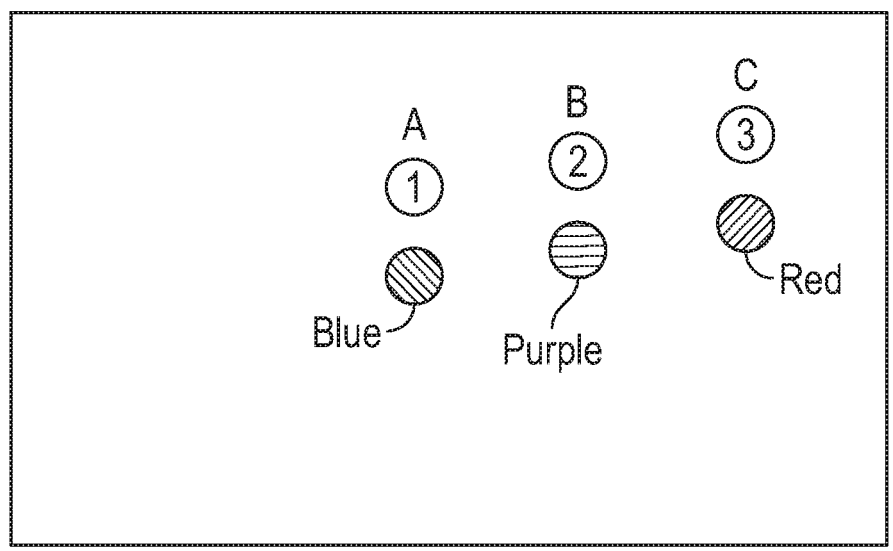
FIG. 6 shows a corresponding second color image captured by the detector for a set of second pulses, where the second mode is used for all pulses with objects at differing distances being encoded with different colors.

In a next step 203, a further set of pulses is output from the light source onto the scene. This time, the driver is triggered in synchronization with the pulses to cause the modulator to apply 204 the ramp shown in FIG. 2(b). The modulated reflected light from the set of pulses strikes the detector array, and, at the end of the integration period, a second color encoded image is generated 205 and stored in memory. Because the wavelength modulation ramp goes the opposite way (from blue to red), nearby objects appear predominately "blue" while more distant objects appear predominately "red," as shown in FIG. 6.

Each of the two stored images, one for each successive series of pulses (that is, each successive integration period of the detector), will encode the range of different objects in their perceived color as represented in the captured image, dependent on the direction of "travel" (red-to-blue or blue-to-red) of the electro-optic wavelength modulator.

In a next step 206, a pixel-by-pixel comparison of the colors in the two images is made and, from this, the range of each of the three objects visible in the two images of the pair is calculated. This is possible provided that the modulation behavior of the modulator is known, and may be implemented using a lookup table stored in a memory that contains pairs of color values for the first and second images.

The range information for each pixel is then used to build a 3D image of the scene or simply to output the spatial location (XYZ) of the objects in the scene.

Figure 8:
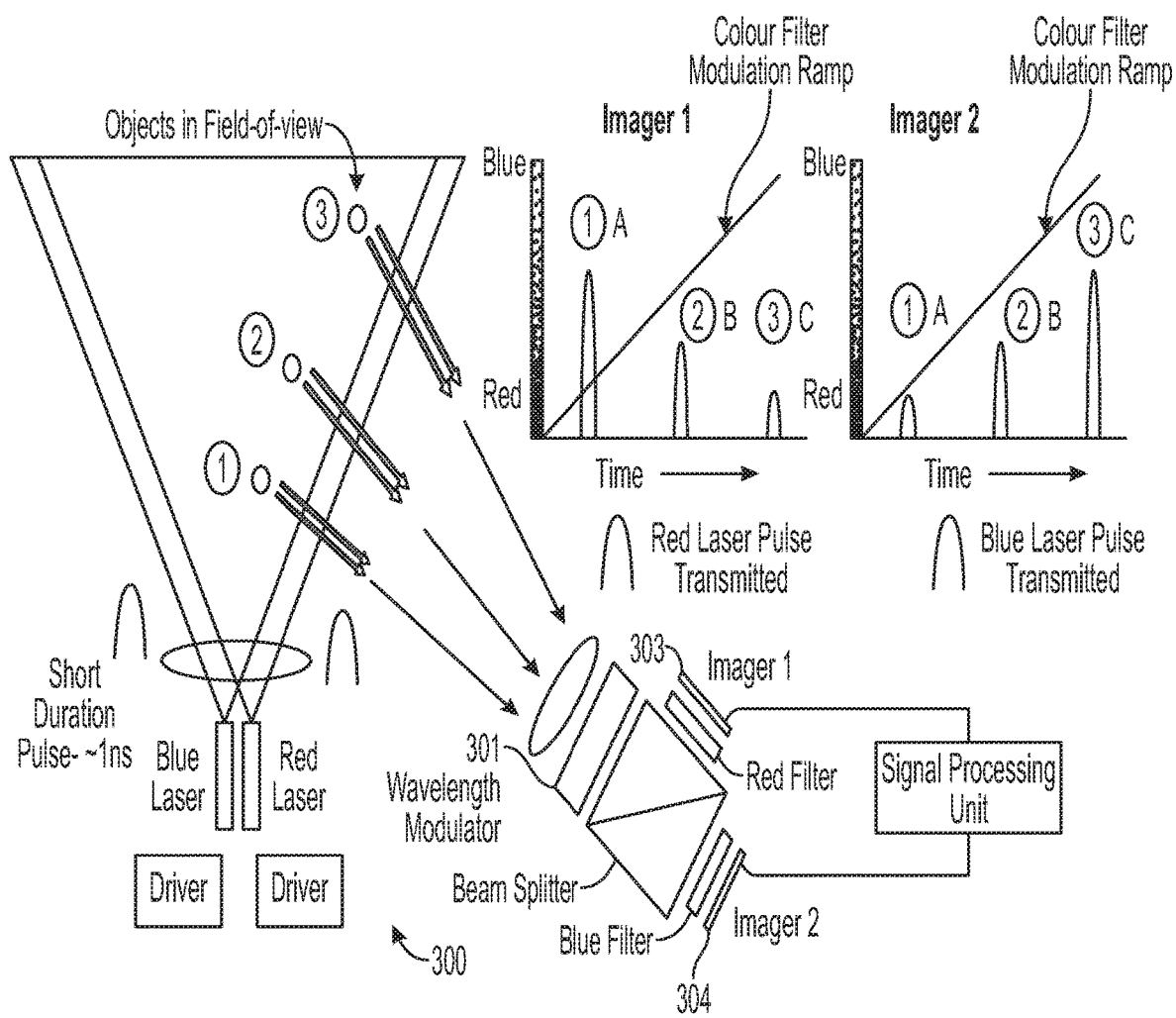
FIG. 8 is an overview of a second embodiment of a 3D imaging system in accordance with an aspect of the invention.

Alternative configurations of the system shown in FIG. 1 can be conceived. For example, in an alternative embodiment of a system 300 shown in FIG. 8, two laser sources 301 and 302 are provided that each emit a pulse at a different wavelength (for convenience, shown as red and blue) simultaneously. At the camera, the returning optical signals pass first through a wavelength modulator 301 then via a beamsplitter 302 to two separate detector sub-arrays 303, 304 with respectively red and blue filters in front of them. This arrangement obviates the need to produce very short white light pulses and also enables the simultaneous (rather than successive) collection of "red" and "blue" images, at the expense of a more complex detector arrangement. In this arrangement, instead of using color-sensitive arrays, the detector sub-arrays may comprise monochrome detectors, which allow the filters to be omitted. In this embodiment, the range information is encoded in each of the two images by the relative intensity of objects in the two images.

In a further modification, the two light sources may be replaced with a single white light source while using the two detector sub-arrays.

In another alternative configuration, the two light sources could be configured with a single color-sensing camera taking successive images, as described in the embodiment of FIG. 1. The two light sources together perform substantially the same function as the single white light source of FIG. 1.

Although the descriptions of the two examples above refer to "white," "red," and "blue" light for ease of explanation, any suitable wavelengths may be used. For white light, any broadband light source may be used. In practice, such a system is likely to operate using infra-red wavelengths so that the emitted beam is not visible. This is especially relevant where the system is fitted to a road vehicle to scan a scene around the vehicle, as non-visible spectrum wavelengths will not distract other road users.

The principle and mode of operation of this invention have been explained and illustrated in its preferred embodiments. However, it must be understood that this invention may be practiced otherwise than as specifically explained and illustrated without departing from its spirit or scope.

What is claimed is:

1. A 3D imaging system comprising:
   a light source arranged to illuminate a scene with at least one optical pulse comprising light of at least two discrete wavelengths;
   an optical detector comprising an array of detection elements; and
   an optical modulator interposed in the optical path between the scene and the optical detector, the modulator being arranged to differentially amplitude modulate the two wavelengths in the reflected portion of the optical pulse as a function of time, wherein the optical modulator comprises a variable wavelength filter that in a first mode of operation differentially modulates the amplitude of the two wavelengths such that the first wavelength is increasingly attenuated over time and the second wavelength is not attenuated or is decreasingly attenuated over that time, the optical modulator in a second mode of operation differentially modulates the amplitude of the two wavelengths whereby the second wavelength is increasingly attenuated over time and the first wavelength is not attenuated or is decreasingly attenuated;
   in which the detector captures a first image of the scene corresponding to the first set of pulses whereby for each pulse the modulator is operated in the first mode only, and in which the detector captures a second image of the scene corresponding to the second set of pulses whereby for each pulse the modulator is operated in the second mode only, and
   in which the first image is captured at a different time to the second image to form a pair of images, and further comprising a signal processing circuit which determines the range of objects in the scene by comparing the colour value measured by each detector element in the array in the first image with the colour value measured by each of the corresponding detector elements in the array that form the second image.

2. A 3D imaging system according to claim 1 in which:
   the light source is arranged to illuminate a scene with at least two sets of optical pulses, each set of pulses comprising at least one pulse comprising light of the at least two discrete wavelengths;
   the optical detector comprises a single array of detection elements wherein each detection element in the detector array is responsive over a range of wavelengths that includes the two wavelengths, the detector array generating a respective colour image for each of the two sets of pulses; and
   in which the optical modulator is arranged to differentially modulate the two wavelengths in the reflected portion of each pulse of the sets of optical pulses as a function of time.

3. The system of claim 1, which further comprises focusing optics which focus a portion of the light pulse that has been reflected or scattered from objects in the scene onto the optical detector, the focusing optics comprising at least one focusing lens located in the optical path upstream of the modulator which forms an image of the scene onto a focal plane, and in which the detector is positioned in the focal plane.

4. The system of claim 1 in which the light source emits broad band white light which includes the two discrete wavelengths.

5. The system according to claim 1 in which the spectrum of light in each pulse is the same.

6. The system of claim 1 in which the comparison constructs a 3D image of the scene.

7. A 3D imaging system according to claim 1 in which:
the detector array comprises a first subarray of detection elements which are each responsive to the first wavelength but not the second wavelength and a second subarray of detection elements that are each responsive to the second wavelength but not the first wavelength, each subarray being arranged in use to output a monochromatic image; and
a beam splitter that receives the light reflected or scattered from the scene and splits it into two beams, a first beam forming an image of the scene on the first sub array and a second beam forming an image of the scene on the second sub array.

8. A 3D imaging system according to claim 7 wherein the first and second arrays comprise colour detector arrays which are each covered with a filter corresponding to a respective one of the two wavelengths.

9. The system of claim 7, further comprising a focusing lens located upstream of the modulator which forms an image of the scene onto a focal plane, and in which the detector is positioned in the focal plane.

10. The system of claim 7 in which the light source emits white light which includes the two discrete wavelengths.

11. A method of 3D imaging objects in a scene, comprising:
(a) illuminating a scene at a first instance with at least one first pulse of light comprising at least two discrete wavelengths, and illuminating the scene at a second instance with at least one second pulse of light having the same two wavelengths;
(b) directing the reflected or scattered light from objects in the scene for the first pulse onto a detector array via an optical modulator to form a first image of the scene, the modulator being arranged to apply a first modulation to the two wavelengths in the reflected portion of the optical pulse as a function of time;
(c) directing the reflected or scattered light from objects in the scene for the second pulse onto the detector array via an optical modulator to form a second image of the scene, the modulator being arranged to apply a second, different, modulation of the two wavelengths in the reflected portion of the optical pulse as a function of time; and
(d) comparing a first image obtained from the detector corresponding to the first pulse with a second image obtained from the detector corresponding to the second pulse to form a 3D image of the scene, in which the step (b) comprises modulating the two wavelengths such that the first wavelength is increasingly attenuated over time and the second wavelength is not attenuated or is decreasingly attenuated over that time, and in which step (c) comprises modulating the two wavelengths whereby the second wavelength is increasingly attenuated over time and the first wavelength is not attenuated or is decreasingly attenuated.

12. The method of claim 11 in which the first image is captured from a sequence of first pulses, and in which the second image is captured from a sequence of second pulses.

13. The method of claim 11 in which the detector array comprises two subarrays, in which step (b) directs the modulated light onto a first of the subarrays and in which step (c) simultaneously directs the modulated light onto a second of the two subarrays.

14. The method of claim 13 in which the directing of the light is performed using a beam splitter.

* * * * *